Figure 1:
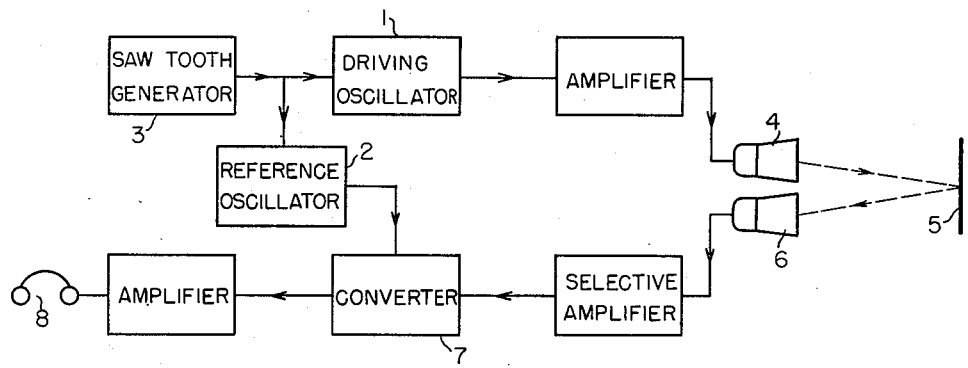

Nov. 17, 1953   W. F. MEEKER ET AL   2,659,878
RANGING SYSTEM
Filed March 4, 1948   3 Sheets-Sheet 1

*INVENTORS*
WILLARD F. MEEKER
FRANK H. SLAYMAKER
BY
ATTORNEY

*INVENTORS*
WILLARD F. MEEKER
BY FRANK H. SLAYMAKER

ATTORNEY

Patented Nov. 17, 1953

2,659,878

UNITED STATES PATENT OFFICE 2,659,878

RANGING SYSTEM

Willard F. Meeker and Frank H. Slaymaker, Rochester, N. Y., assignors to Stromberg-Carlson Company, a corporation of New York Application March 4, 1948, Serial No. 13,065

9 Claims. (Cl. 340—16)

This invention relates to ranging systems and more particularly to readily portable systems used for locating unseen objects. Our invention finds particular application in blind aid or guidance devices.

In many situations where it is not possible to determine visually the location of objects, it is frequently desirable to provide warning signals which vary according to some characteristic when the user approaches an object or when an object moves relative to the user, as the case may be. It has been proposed heretofore to provide audible signals for this purpose, the pitch varying in accordance with the distance to an object returning a signal.

One such proposed arrangement, illustrated in United States Patent 2,474,918, issued to Slaymaker and Meeker on July 5, 1949, and assigned to the same assignee as the present invention, employs a frequency modulation ranging system wherein a transmitter radiates signals varying in frequency and wherein a receiver receives signals or echoes reflected from an object or objects in the path of the radiated signals. Such a system may comprise a suitable generator, such as a sawtooth oscillator, arranged to control the operation of a supersonic generator so that the frequency thereof varies with time. The output of the generator is then utilized to drive a selective, directive radiator which converts the electrical energy into sound energy of supersonic frequency. Radiation is permitted only during a portion of each cycle. When the radiated energy strikes an obstacle, some of the energy is reflected and is picked up by a selective, directive microphone. A voltage whose frequency is the difference between the echo frequency and the generator frequency is converted into audible sound. The difference between the frequencies of the echo and that of the generator is proportional to the time lag between the radiated and the returning signal and, therefore, is also proportional to the distance to the object returning the echo. With this type of system a low frequency pulse indicates a nearby object and a high frequency pulse indicates a more distant object.

It is an object of our invention to provide a new and improved ranging system which utilizes a minimum amount of power to provide adequate response.

Still another object of our invention is to provide a new and improved frequency modulation ranging system in which the frequency of the audible signals is sufficiently high to avoid confusion and to command maximum attention.

Another object of our invention is to provide a new and improved frequency modulation ranging system of the foregoing type in which the audible signal is of relatively high frequency for nearby objects and relatively low frequency for more distant objects.

In accordance with our invention, there are provided two oscillators, one being termed a first or driving oscillator and the other being denominated a second or reference oscillator. The frequency of both oscillators is caused to vary cyclically as to frequency at substantially the same rate, each within a given band of frequencies with respect to time, but the frequency band employed in connection with one of the oscillators is different from that employed by the other oscillator. In this system the difference between the frequency of the returning signal and that of the reference oscillator is obtained as an audible beat note. For example, if the frequency of the reference oscillator is two hundred cycles per second higher than the frequency of the driving oscillator, the audio beat note for any distance is two hundred cycles per second higher than for the same distance in the prior system referred to above. Thus, the pitch of the beat note is proportional to the distance plus a fixed distance so that there is a unique correspondence between pitch and distance for all signals. At zero distance, instead of zero frequency, there is produced a frequency sufficiently high to be adequately reproduced and readily distinguished from any other sound. The reference frequency may be either higher or lower than the driving frequency.

Figure 8:
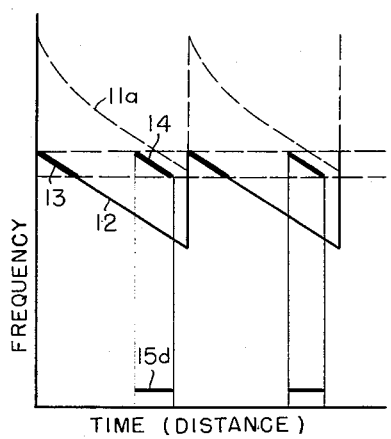
Figure 9:
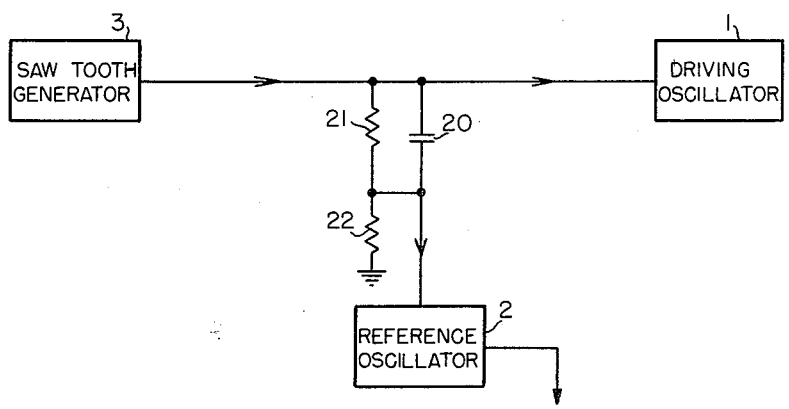

Other objects and advantages of our invention will become apparent as the following description proceeds, and the features of novelty which characterize our invention will be pointed out with particularity in the claims annexed to and forming a part of this specification. For a better understanding of our invention, reference may be had to the accompanying drawing in which Fig. 1 is a block diagram illustrating the disposition of components comprising our invention, Figs. 2 to 8, inclusive, are charts useful in understanding the principles of our invention, and Fig. 9 illustrates another embodiment of our invention.

Referring to the drawings in detail, there is illustrated in Fig. 1 one embodiment of our invention comprising a suitable first or driving oscillator 1 and a suitable second or reference oscillator 2. The frequency of both oscillators 1 and 2 is caused to vary in a desired manner. In the embodiment illustrated in Fig. 1 such means comprises a suitable sawtooth wave generator 3, the sawtooth wave appearing in the output thereof being impressed upon both oscillators 1 and 2.

Figure 2:
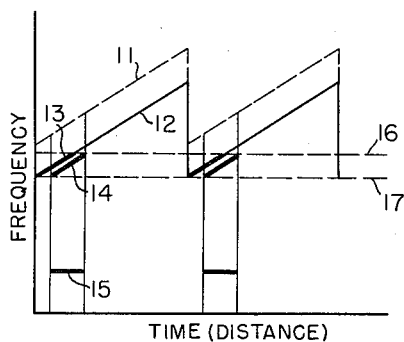

The preferred embodiment of our invention employs a sawtooth waveform approximately of the shape indicated by the dashed line 11 of Fig. 2. However, other wave shapes may be employed and may be non-linear or of the form shown in Fig. 10, for example.

The driving oscillator 1 is designed to oscillate continuously, and the output thereof is employed to drive a suitable radiating element 4. If necessary, suitable amplifying means may be employed in the output of oscillator 1. Means is employed to limit the radiation or emission of signals to a predetermined portion of each cycle, as by utilizing for the element 4, a selective transducer of the type shown, described and claimed in the copending application of Frank H. Slaymaker, Willard F. Meeker, and Lynn C. Merrill, Serial No. 676,425, filed June 13, 1946, now Patent 2,541,944 and assigned to the same assignee as the present invention or by employing a selective or band-pass amplifier following oscillator 1, for example.

The above-mentioned portion or band of frequencies is reflected from any object in the path of the radiated oscillations, as indicated by numeral 5 in Fig. 1, and the echoes received by a suitable receiving element or means 6 and impressed upon a suitable converter indicated by the numeral 7, after being amplified if necessary. Means 6 may comprise a transducer identical to transducer 4. Reference oscillator 2 is arranged to generate additional oscillations which vary cyclically over a band of frequencies different from that generated by oscillator 1 either above or below the band of frequencies of oscillator 1. The output of reference oscillator 2 and the received oscillations are combined in converter 7 and then translated into audible signals and reproduced in suitable reproducing means as for example, headphones 8. The output of converter 7 may be amplified if necessary. The difference between the frequency of the returning signal and that of the reference oscillator results in an audible beat note, the frequency of which is a measure of the distance to any object or objects encountered by the radiated oscillations.

Inasmuch as each of the elements or components of Fig. 1 can be one of different forms known to the art, it is believed unnecessary to give any circuit details.

Figure 3:
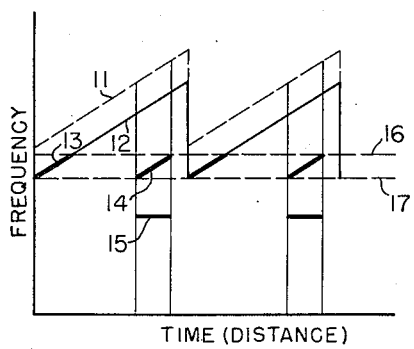

Typical conditions encountered during operation of such a system as that described above are illustrated in Figs. 2 to 8, inclusive. In Figs. 2 and 3 there are depicted possible conditions resulting when the frequency of operation of the reference oscillator 2 is higher than the frequency of the driving oscillator 1. The variation in frequency with time of the reference oscillator is illustrated by the dashed line 11 and the variation in frequency with time of the driving oscillator is illustrated by the solid line 12.

The radiation of oscillations only during predetermined periods is indicated by the heavy portions 13 of line 12, the upper and lower limits of the pass band being indicated by numerals 16 and 17, respectively. The reflected echoes are represented by the heavy lines 14 and the beat notes resulting from the combination of the received oscillations and the reference oscillations are indicated by the lines 15.

Inasmuch as the distance to the object producing the echoes is a function of the time required for the radiated oscillations to reach the object and be returned, a comparison of Figs. 2 and 3 indicates that as the distance to the object increases, the frequency of the beat note increases. This is reproduced, as by the reproducing means 8, as a sound of different pitch according to the distance. In the present system zero distance produces a signal or sound of a predetermined minimum frequency which can be made sufficiently high to be easily recognized and not confused with other sounds of low pitch.

Figs. 4 to 8, inclusive, illustrate other conditions of operation and similar conditions or results are indicated by the same numerals as used in considering Figs. 2 and 3.

Figure 4:
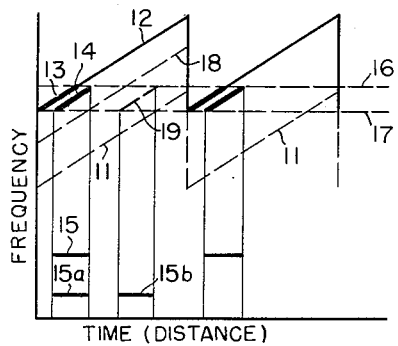
Figure 5:
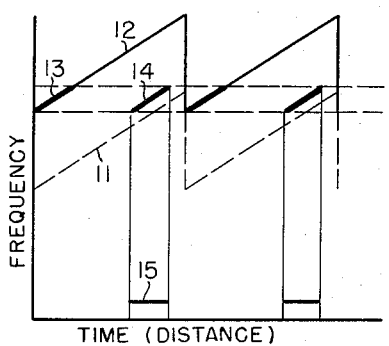

Figs. 4 and 5 disclose typical results in a system which is similar to that giving the results depicted in Figs. 2 and 3, but in which the reference frequency is lower than the driving frequency. Hence, as shown in Figs. 4 and 5, closer objects (Fig. 4) give a sound of higher pitch than more remote objects (Fig. 5). Only that portion of the driving oscillator output which lies within the pass band determined by the selective radiator 4, microphone 6 and any amplifiers employed reaches the converter and beats against the reference oscillations. Thus, the difference between the echo frequency and the reference frequency is larger for nearby objects than for more distant objects. The highest frequency which the reference oscillator reaches preferably does not exceed the upper frequency limit of the pass band of the system. Reference to Fig. 4 will bring out why this is so. If the reference oscillator frequency is represented by line 18, signals corresponding to echo positions 14 and 19, representing two different distances, give the same beat note, as indicated by numerals 15a and 15b, and hence the user of the device is unable to determine which is the correct distance to the object.

Figure 6:
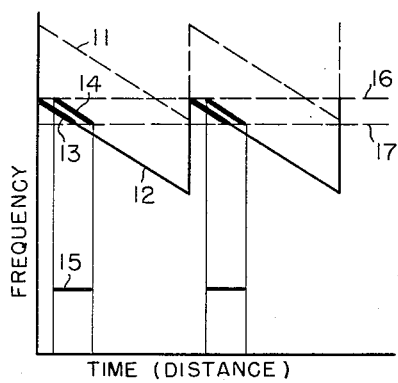

Fig. 6 illustrates the effect of a reversal of the slope of the sawtooth oscillations employed in connection with our systems. The systems illustrated in Figs. 2 to 5, inclusive, utilize a frequency-time variation with a positive slope of substantial time duration and a negative slope of short duration whereas in Fig. 6 there is illustrated a condition where the circuit components are chosen to provide a frequency-time variation with a reversed slope relationship. In this case, if a unique correspondence between distance and frequency for all echoes returning in the same period in which they are radiated is desired, the lowest frequency which the reference oscillator reaches should not be less than the lower frequency limit of the band pass system.

Figure 7:
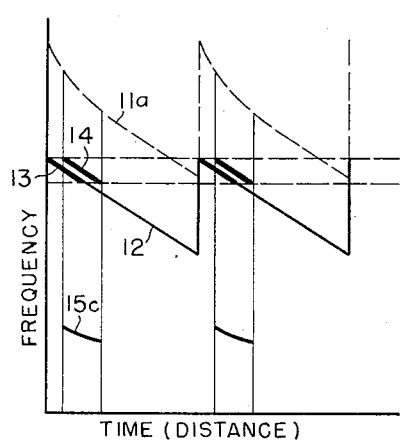

Inasmuch as the ear responds to frequency changes on a percentage basis, a system such as that disclosed in Figs. 4, 5 and 6 is less sensitive to small changes in distance for nearby objects than for small changes in distance for remote objects. In Figs. 7, 8 and 9, there are illustrated embodiments of our invention according to which a greater change in frequency with distance for nearby objects is provided.

Referring to Figs. 7 and 8, there is shown a non-linear variation of frequency by means of the dashed line 11a. This result is obtained by providing a sawtooth wave having a non-linear variation during the early part of each cycle and a linear variation during the remaining portion of each cycle. In addition to the foregoing effect the resulting beat note, as indicated by the slightly curved lines 15c, varies in frequency throughout its length, as indicated in Fig. 7. In Fig. 8, there is indicated an effect at a greater distance corresponding to the linear portion of the sawtooth wave 11a. Under the latter condition, beat note 15d is constant in frequency. It is thus seen that the beat note produced by an echo of a nearby object varies in frequency while that from a more distant object remains constant. It should be understood that other modifications are possible, and any predetermined portion of each cycle may be caused to be non-linear, the remaining portions being as linear as possible, and it is also within the scope of our invention that the entire slope of one or both oscillator outputs may be non-linear, or one may have a portion more non-linear than another, for example.

In Fig. 9 there is illustrated one suitable means for providing the sawtooth pattern of the type represented by numeral 11a in Figs. 7 and 8 and embodies a resistance-capacitance circuit including a suitable capacitor 20 and resistor 21 connected in parallel between the output of the sawtooth generator 3 and the input to reference generator 2. One junction of network 20, 21 is connected to the output of generator 3 and the input of driving oscillator 1. The other junction is connected to oscillator 2 and also to ground through a suitable resistor 22. The time constant of capacitor 20 and resistor 21 is chosen sufficiently small with respect to the time constant of the source of sawtooth oscillations or generator 3 so that the current surge through capacitor 20 which occurs at the time of the abrupt rise of the sawtooth wave passes through capacitor 20 so that the maximum amplitude of the sawtooth is established across resistor 22, capacitor 20 acting as a short circuit across resistor 21. During the remaining portion of each cycle, resistors 21 and 22 form a voltage divider, and, therefore, during the remainder of each cycle the voltage at the junction between the resistors 21 and 22 varies in substantially a linear manner. The result is indicated by the dashed line 11a of Figs. 7 and 8. A different means for obtaining a non-linear reference wave comprises the utilization of separate trigger means for oscillators 1 and 2 instead of a single source of sawtooth voltage, the separate trigger means being maintained in step, and the means feeding and controlling the oscillator 2 having suitable spikes in the output.

While we have shown and described a particular embodiment of our invention, it will be obvious to those skilled in the art that changes and modifications may be made without departing from our invention in its broader aspects. For example, except for portions of curve 11a (Figs. 7 and 8) the frequency variation of the oscillators is shown to be linear. Non-linear variations are within the spirit of our invention. Further, a constant difference between reference and driving oscillator frequencies is not essential. We, therefore, aim in the appended claims to cover all such changes and modifications as fall within the true spirit and scope of our invention.

What is claimed is:

1. In a ranging system, first oscillating means arranged to generate oscillations which vary cyclically as to frequency within a given band of frequencies, means for radiating oscillations of frequencies within a portion only of said band, means for receiving said radiated oscillations after reflection from objects in the path of radiation of said oscillations, second oscillating means arranged to generate additional oscillations which vary cyclically as to frequency in the same manner as said oscillations of said first oscillating means but within a different band of frequencies said cyclic variations of said first and second oscillating means being fixed in phase with each other, means for combining said received oscillations with said additional oscillations, and means for translating the combined oscillations and audible signals directly indicative of the range of said objects.

2. In a ranging system, first oscillating means arranged to generate oscillations which vary cyclically as to frequency within a given band of frequencies, means for radiating oscillations of frequencies within a portion only of said band, means for receiving said radiated oscillations after reflection from objects in the path of radiation of said oscillations, second oscillating means arranged to generate additional oscillations at a predetermined difference from the frequency of oscillation of said first oscillating means, said cyclic variations of said first and second oscillating means being fixed in phase with each other, means for combining said received oscillations with said additional oscillations, and means for translating the combined oscillations into audible signals directly indicative of the range of said objects.

3. In a ranging system, first oscillating means arranged to generate oscillations which vary cyclically as to frequency within a first band of frequencies, means for radiating oscillations of frequencies within a portion only of said band, means for receiving said radiated oscillations after reflection from objects in the path of radiation of said oscillations, second oscillating means arranged to generate additional oscillations which vary cyclically as to frequency within a second band of frequencies above the first band of frequencies, said cyclic variations of said first and second oscillating means being fixed in phase with each other, means for combining said received oscillations with said additional oscillations, and means for translating the combined oscillations into audible signals directly indicative of the range of said objects.

4. In a ranging system, first oscillating means arranged to generate oscillations which vary cyclically as to frequency within a given band of frequencies, means for radiating oscillations of frequencies within a portion only of said band, means for receiving said radiated oscillations after reflection from objects in the path of radiation of said oscillations, second oscillating means arranged to generate additional oscillations which vary cyclically as to frequency within a second band of frequencies below the first band of frequencies, the cyclic variations of said first and second oscillating means being fixed in phase with each other, means for combining said received oscillations with said additional oscillations, and means for translating the combined oscillations into audible signals directly indicative of the range of said objects.

5. In a ranging system, first oscillating means arranged to generate oscillations which vary cyclically as to frequency within a given band of frequencies, means for radiating oscillations of frequencies within a portion only of said band, means for receiving said radiated oscillations after reflection from objects in the path of radiation of said oscillations, second oscillating means arranged to generate additional oscillations which vary cyclically as to frequency within a different band of frequencies, said cyclic variations of said first and second oscillating means being fixed in phase with each other, the frequency of said additional oscillations at the end of each cycle lying within said portion of said band, means for combining said received oscillations with said additional oscillations, and means for translating the combined oscillations into audible signals directly indicative of the range of said objects.

6. In a ranging system, first oscillating means arranged to generate oscillations which vary cyclically as to frequency within a first band of frequencies, means for radiating oscillations of frequencies within a portion only of said band, means for receiving said radiated oscillations after reflection from objects in the path of radiation of said oscillations, second oscillating means arranged to generate additional oscillations which vary cyclically as to frequency within a second band of frequencies above the first band of frequencies, the lowest frequency of said additional oscillations being not less than the lower frequency limit of said portion of said band, the cyclic variations of said first and second oscillating means being fixed in phase with each other, means for combining said received oscillations with said additional oscillations, and means for translating the combined oscillations into audible signals directly indicative of the range of said objects.

7. In a ranging system, first oscillating means arranged to generate oscillations which vary cyclically as to frequency within a given band of frequencies, means for radiating oscillations of frequencies within a portion only of said band, means for receiving said radiated oscillations after reflection from objects in the path of radiation of said oscillations, second oscillating means arranged to generate additional oscillations which vary cyclically as to frequency within a second band of frequencies below the first band of frequencies, the frequency of said additional oscillations at the end of each cycle not exceeding the upper limit of said given band of frequencies, said cyclic variations of said first and second oscillating means being fixed in phase with each other, means for combining said received oscillations with said additional oscillations, and means for translating the combined oscillations into audible signals directly indicative of the range of said objects.

8. In a ranging system, first oscillating means arranged to generate oscillations which vary cyclically as to frequency within a given band of frequencies, means for radiating oscillations of frequencies within a portion only of said band, means for receiving said radiated oscillations after reflection from objects in the path of radiation of said oscillations, second oscillating means arranged to generate additional oscillations which vary cyclically as to frequency within a given band of frequences, said cyclic variations of said first and second oscillating means being fixed in phase with each other, means for combining said received oscillations with said additional oscillations and means for translating the combined oscillations into audible signals directly indicative of the range of said objects, said second oscillating means having a rate of change of frequency which varies at a greater rate over a portion of each cycle than over the remainder of each cycle, said first oscillating means having a rate of change of frequency over the entire cycle which corresponds substantially to that of said remainder and which varies by a substantially constant amount from said remainder, whereby the combined signal varies in frequency when objects causing reflection are located in a predetermined range but does not vary in frequency when objects causing reflection are outside of the predetermined range.

9. In a ranging system, means for providing oscillations which vary cyclically as to frequency within a given band of frequencies, means for radiating oscillations of frequencies within a portion only of said band, means for receiving said radiated oscillations after reflection from objects in the path of radiation of said oscillation, means for providing additional oscillations which vary cyclically as to frequency in the same manner as said first-mentioned means but within a different band of frequencies the cyclic variations of said first and last-named oscillation providing means being fixed in phase with each other, means for combining said received oscillations with said additional oscillations, and means for translating the combined oscillations into audible signals directly indicative of the range of said objects.

WILLARD F. MEEKER.
FRANK H. SLAYMAKER.

References Cited in the file of this patent

UNITED STATES PATENTS

| Number | Name | Date |
|---|---|---|
| 1,501,105 | Fessenden | July 15, 1924 |
| 2,253,975 | Guanella | Aug. 26, 1941 |
| 2,256,539 | Alford | Sept. 23, 1941 |
| 2,268,587 | Guanella | Jan. 6, 1942 |
| 2,371,988 | Granqvist | Mar. 20, 1945 |
| 2,405,134 | Brown et al. | Aug. 6, 1946 |
| 2,407,644 | Beinoff | Sept. 17, 1946 |
| 2,433,361 | Harrison | Dec. 30, 1947 |
| 2,433,804 | Wolff | Dec. 30, 1947 |
| 2,474,918 | Slaymaker et al. | July 5, 1949 |
| 2,507,746 | Wright | May 16, 1950 |
| 2,525,328 | Wolff | Oct. 10, 1950 |